United States Patent
Hong et al.

(10) Patent No.: US 7,630,048 B2
(45) Date of Patent: Dec. 8, 2009

(54) LIQUID CRYSTAL DISPLAY DEVICE

(75) Inventors: Jin Cheol Hong, Gumi-si (KR); Min Hwa Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 396 days.

(21) Appl. No.: 11/585,286

(22) Filed: Oct. 24, 2006

(65) Prior Publication Data

US 2007/0091243 A1    Apr. 26, 2007

(30) Foreign Application Priority Data

Oct. 25, 2005    (KR) .................. 10-2005-0100825

(51) Int. Cl.
 *G02F 1/1345*    (2006.01)
(52) U.S. Cl. ...................... 349/150; 349/149
(58) Field of Classification Search .............. None
 See application file for complete search history.

(56) References Cited

U.S. PATENT DOCUMENTS

| 5,189,539 | A | * | 2/1993 | Suzuki ................ 349/150 |
| 5,258,866 | A | * | 11/1993 | Ishikawa et al. ............ 349/150 |
| 7,385,665 | B2 | * | 6/2008 | Matsumoto ................ 349/150 |
| 2002/0122149 | A1 | | 9/2002 | Choo et al. |
| 2004/0036833 | A1 | | 2/2004 | Monzen |
| 2005/0183884 | A1 | * | 8/2005 | Su ................ 174/257 |
| 2007/0097309 | A1 | * | 5/2007 | Matsumoto ............... 349/149 |

FOREIGN PATENT DOCUMENTS

| JP | 61003126 | 1/1986 |
| JP | 63-177499 | 7/1988 |
| JP | 9-246676 A | 9/1997 |
| JP | 2000-312070 | 11/2000 |
| JP | 200312070 | 11/2000 |
| JP | 2002341786 | 11/2002 |

* cited by examiner

*Primary Examiner*—Sung H Pak
(74) *Attorney, Agent, or Firm*—McKenna Long & Aldridge LLP

(57) ABSTRACT

A liquid crystal display (LCD) includes a liquid crystal panel a liquid crystal panel including first and second substrates, and a liquid crystal layer disposed between the first and second substrates; a gate driving block including a plurality of gate drivers disposed in an edge area of the first substrate; a data driving block including a plurality of data drivers each connected to the first substrate and to a source printed circuit board (PCB) by a respective tape carrier package (TCP) of a plurality data TCPs; and a data pad unit disposed on each data TCP, wherein pitches of data pads disposed on each data pad unit are different in different portions of the of each data TCP, and the data pads are each to transmit a data signal from the data driving block to a data line of the liquid crystal panel.

11 Claims, 5 Drawing Sheets

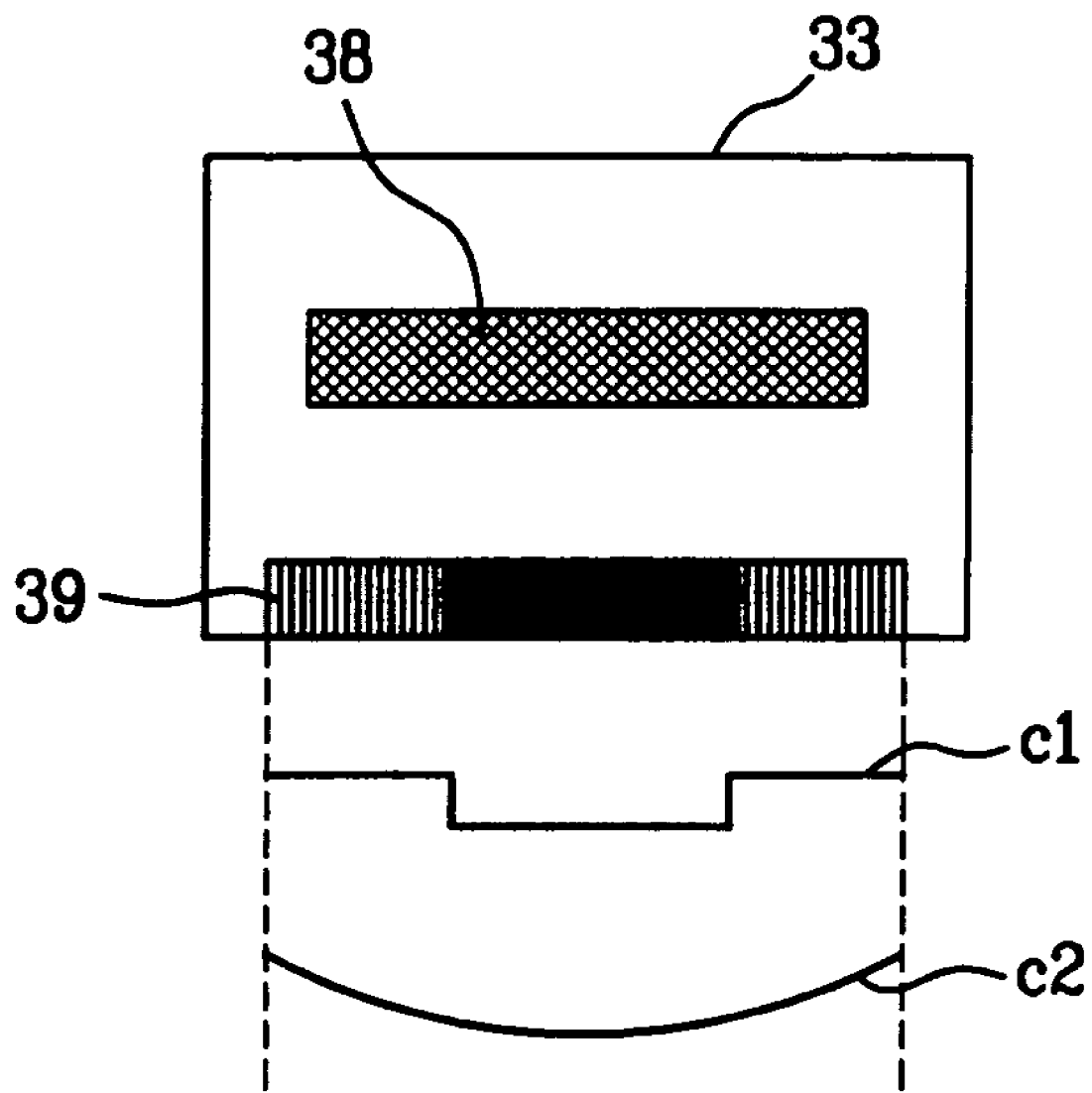

ium crystal display device that substantially obviates one

LIQUID CRYSTAL DISPLAY DEVICE

This application claims the benefit of Korean Patent Application No. P2005-100825, filed on Oct. 25, 2005, which is hereby incorporated by reference for all purposes as if fully set forth herein.

BACKGROUND OF THE INVENTION

1. Field of the Invention

The present invention relates to a liquid crystal display (LCD) device, and more particularly, to a data driving block for an LCD. device.

2. Discussion of the Related Art

The demand for various display devices has increased with the development of an information society. Accordingly, many efforts have been made to research and develop various flat panel display devices such as liquid crystal displays (LCD), plasma display panels (PDP), electroluminescent displays (ELD), and vacuum fluorescent displays (VFD). Some types of flat panel display devices are used as displays in various types of equipment.

Among the various flat display devices, LCD. devices have been the most widely used substitutes for cathode ray tube (CRT) displays because LCD devices have advantageous characteristics of compact size, thin profile, and low power consumption. In addition to use in mobile type devices such as notebook computers, LCD devices have been employed as computer monitors and in televisions to receive and display broadcasting signals.

Hereinafter, a related art LCD device will be explained with reference to FIGS. 1. and 2 of the accompanying drawings.

FIG. 1 is a layout of a related art LCD device. FIG. 2 is a plan view of illustrating a pitch of a data driving block in a related art LCD device.

As shown in FIGS. 1 and 2, a related art LCD device includes a liquid crystal panel 20 that includes lower and upper substrates 11 and 10; a liquid crystal layer disposed between the lower and upper substrates 11 and 10; a gate driving block 12 that includes a plurality of gate drivers disposed at the edge of the lower substrate 11; a data driving block carrier packages (TCPs) 13; and a seal line 16 provided in the margin of the lower and upper substrates 11 and 10 to bond the lower and upper substrates 11 and 10 to each other.

In the above described structure, an integrated circuit (IC) connects the gate driving block 12 to the data driving block 15. The IC may be a flexible printed circuit (FPC) or a chip on film (COF) device. The example illustrated in FIG. 1 includes a gate COF device.

Further, a timing controller (not shown) is provided to supply control signals and video information to the gate driving block 12 and the data driving block 15.

The liquid crystal panel 20 includes a pixel unit 21 for displaying images. The pixel unit 21 includes: a plurality of gate lines perpendicularly crossing a plurality of data lines on the lower substrate 11 to thereby define a matrix of pixel regions; a plurality of pixel electrodes respectively formed in the pixel regions defined by the gate and data lines; and a plurality of thin film transistors formed adjacent to crossings of the gate and data lines for applying a signal on the data line to each pixel electrode in accordance with a signal provided on the gate line.

Each thin film transistor includes a gate electrode protruding from one side of the gate line; a gate insulating layer formed on an entire surface of the lower substrate including the gate electrode; an active layer overlapping the gate electrode; a source electrode overlapping one side of the data line and one side of the gate electrode; and a drain electrode provided at a predetermined interval from the source electrode.

A passivation layer is formed on the lower substrate including the data line and a first contact hole is provided in the passivation layer at a predetermined portion corresponding to the drain electrode. The drain electrode contacts the pixel electrode through the first contact hole in the passivation layer.

Although not shown, the upper substrate 10 includes a color filter layer in each pixel region, a black matrix layer, and a common electrode corresponding to the pixel electrode of the lower substrate 11.

In a LCD device having the above structure, liquid crystal molecules of the liquid crystal layer are driven by a voltage applied to the common and pixel electrodes that generates an electric field between the lower and upper substrate 11 and 10.

The data driving block 15 includes a data pad unit 19 to transmit the data signal from a data chip 18 to a data line of the liquid crystal panel 20.

As shown in FIG. 2, the data pad unit 19 has a constant pitch 'd' on each data TCP 18. That is, the data pad unit 19 includes of a plurality of data pads 23 each having the same width and with adjacent data pads 23 spaced apart by a constant interval.

However, when each data TCP 13 of the data driving block 15 is bonded to the pad of the lower substrate 11 where the data pad unit 19 has the same pitch, a misalignment may result from differential expansion of portions of the data pad unit 19.

SUMMARY OF THE INVENTION

Accordingly, the present invention is directed to a liquid crystal display (LCD) device that substantially obviates one or more problems due to limitations and disadvantages of the related art.

An advantage of the present invention is to provide an LCD device in which pad pitches of a data driving block use a diverse pitch design to thereby prevent misalignment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an LCD device includes: a liquid crystal panel including first and second substrates, and a liquid crystal layer disposed between the first and second substrates; a gate driving block including a plurality of gate drivers disposed in an edge area of the first substrate; a data driving block including a plurality of data drivers each connected to the first substrate and to a source printed circuit board (PCB) by a respective tape carrier package (TCP) of a plurality of data TCPs; and a data pad unit disposed on each data TCP, wherein pitches of data pads disposed on each data pad unit are different in different portions of the of each data TCP, and the data pads are each to transmit a data signal from the data driving block to a data line of the liquid crystal panel.

In another aspect of the present invention, an LCD device includes: a liquid crystal panel including first and second substrates, and a liquid crystal layer provided between the first and second substrates; a gate driving block including a plurality of gate drivers disposed in an edge area of the first substrate; a data driving block including a plurality of data drivers each connected to the first substrate and to a source printed circuit board (PCB) by a respective tape carrier package (TCP) of a plurality of data TCPs; and a data pad unit disposed on each data TCP having data pads disposed on the data pad unit, the data pads to transmit a data signal from the data driving block to a data line of the liquid crystal panel, wherein the pitch of adjacent data pads of each data TCP increases with increased distance of the adjacent data pads from a central portion of the respective data TCP according to a continuous pitch profile curve.

In another aspect of the present invention, a method of manufacturing a liquid crystal display (LCD) device includes: providing a first and a second substrate; disposing a liquid crystal layer between the first and second substrates; and bonding the first substrate to the second substrate ;disposing a gate driving block including a plurality of gate drivers in an edge area of the first substrate; providing a data driving block including a plurality of data drivers each connected to the first substrate and to a source printed circuit board (PCB) by a respective tape carrier package (TCP) of a plurality data TCPs; disposing a data pad unit on each data TCP having data pads disposed on each data pad unit, the data pads to transmit a data signal from the data driving block to a data line of the liquid crystal panel, wherein pitches of data pads disposed on each data pad unit are different in different portions of the respective data TCP.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a graph illustrating pitch designs for a pad according to embodiments of the present invention.

DETAILED DESCRIPTION OF THE ILLUSTRATED EMBODIMENTS

Reference will now be made in detail to the embodiments of the present invention, examples of which are illustrated in the accompanying drawings.

Figure 1:
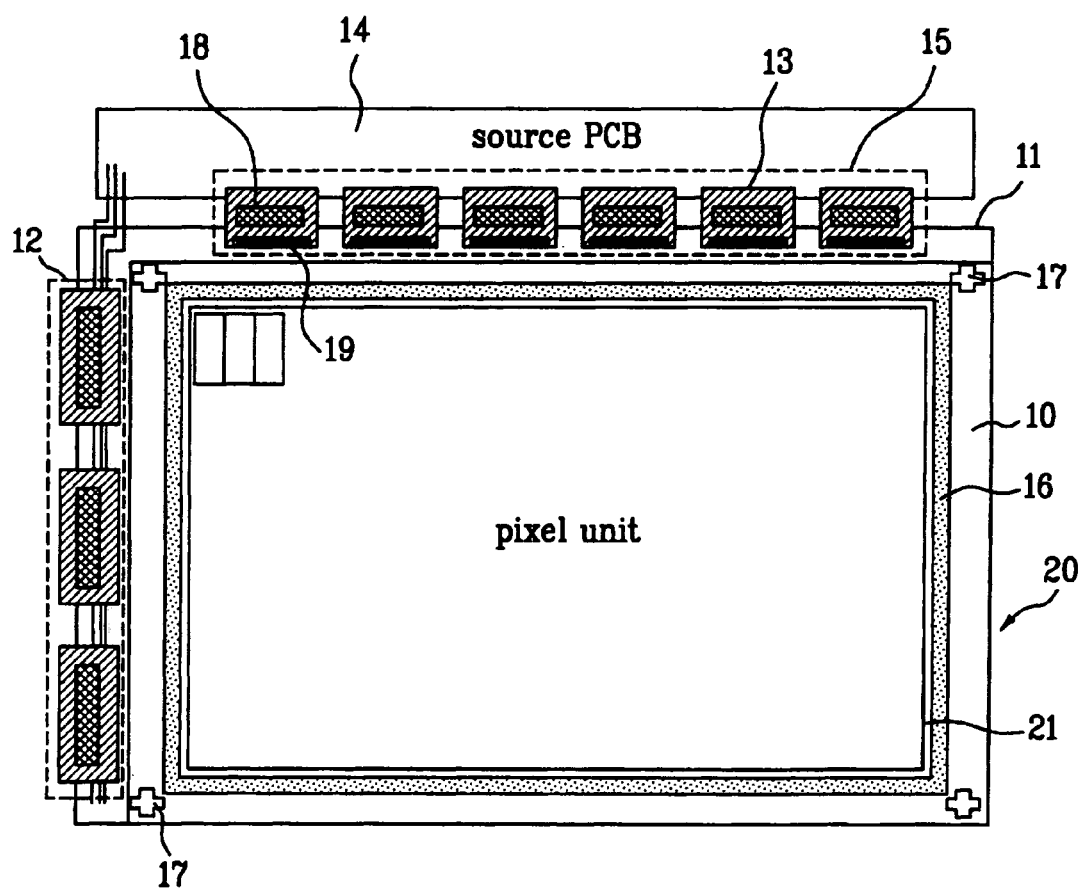
FIG. 1 is a plan view illustrating a layout of a related art LCD device.
Figure 2:
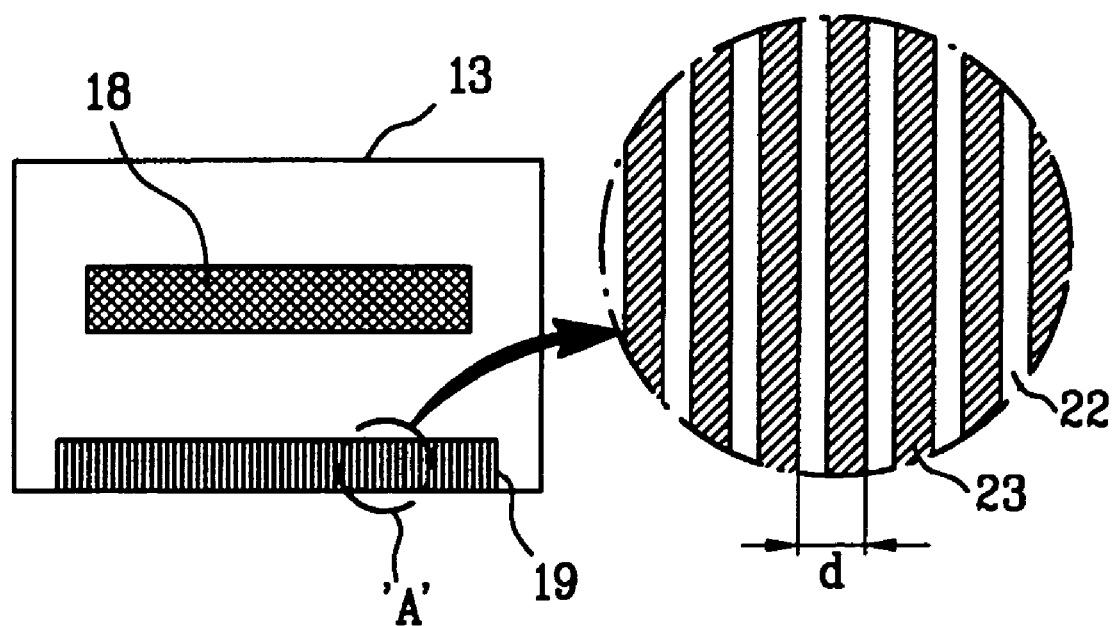
FIG. 2 is a plan view illustrating a pitch of a data driving block in a related art LCD device.
Figure 3:
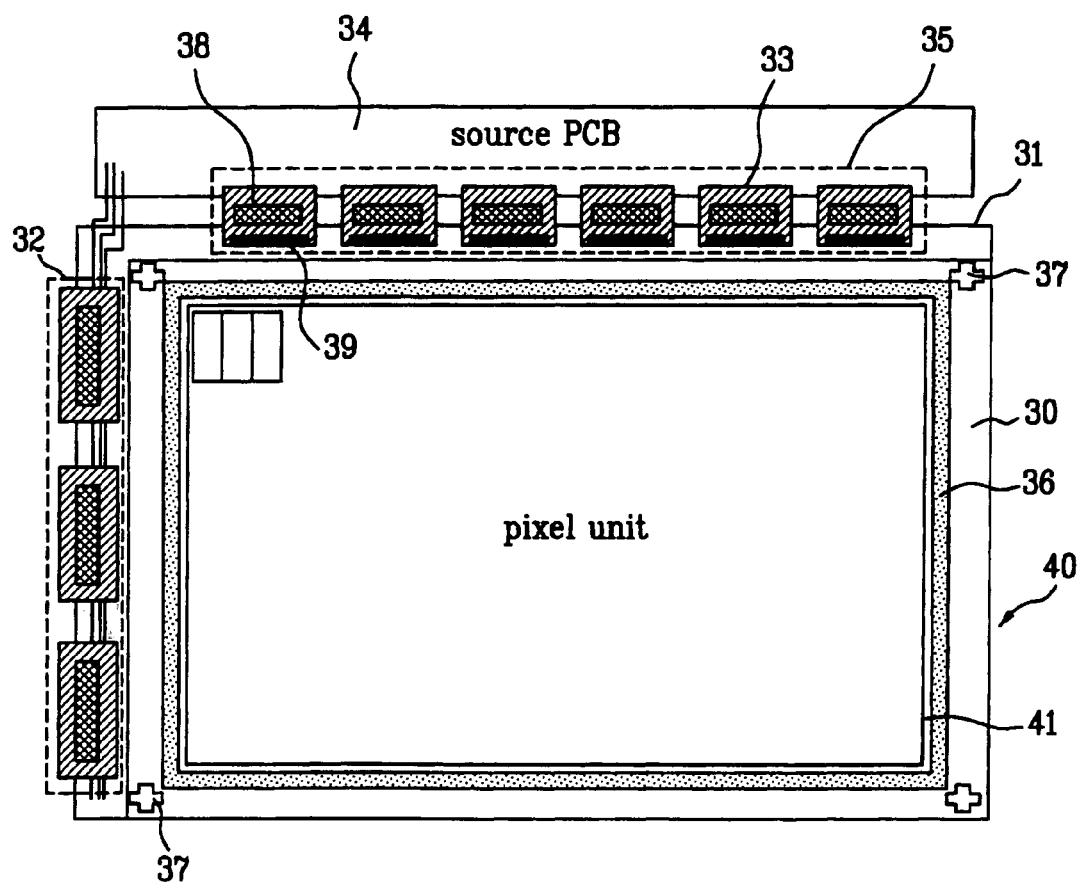
FIG. 3 is a plan view illustrating a layout of an LCD device according to an embodiment of the present invention.
Figure 4:
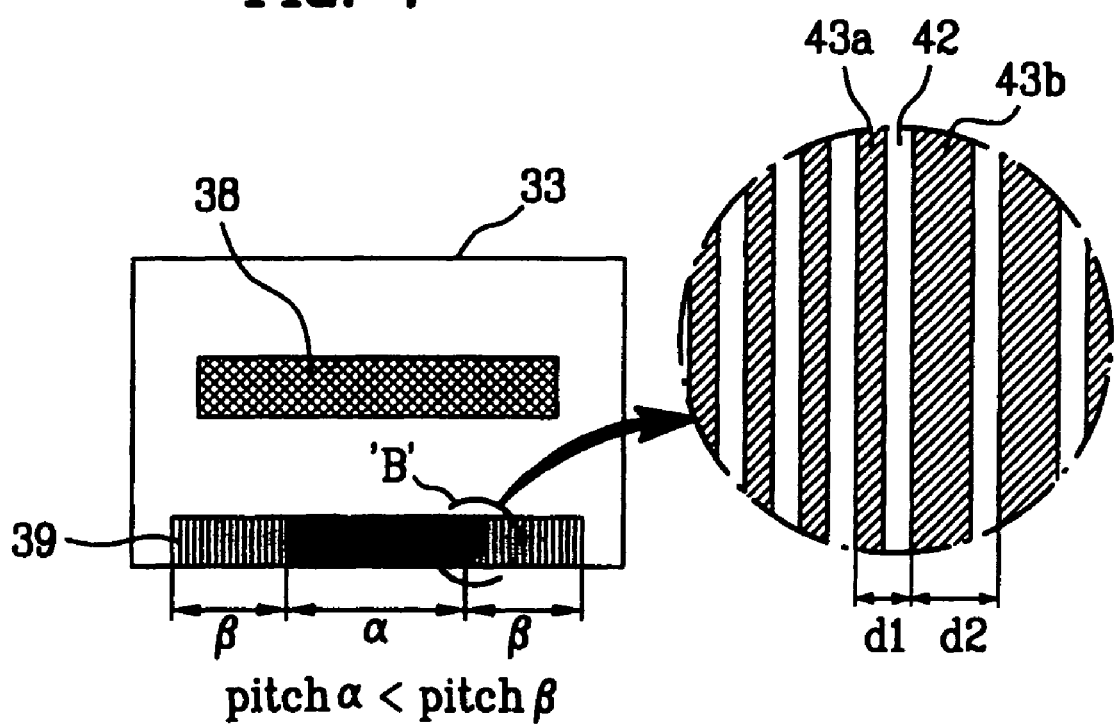
FIG. 4 is a plan view illustrating a pad pitch design for a data driving block in an LCD device according to an embodiment of the present invention.

FIG. 3 is a plan view illustrating a layout of an LCD device according to an embodiment of the present invention. FIG. 4 is a plan view illustrating a pad pitch design for a data driving block in an LCD device according to an embodiment of the present invention; and FIG. 5 is a graph illustrating pitch designs for a pad according to embodiments of the present invention.

As shown in FIGS. 3 and 4, an LCD device according to an embodiment of the present invention includes a liquid crystal panel 40 that includes lower and upper substrates 31 and 30, and a liquid crystal layer disposed between the lower and upper substrates 31 and 30; a gate driving block 32 that includes a plurality of gate drivers disposed in an edge area of the lower substrate 31; a data driving block 35 that includes a plurality of drivers connect to a source PCB 34 by respective data TCPs 33; and a seal line 36 provided in the margin of the lower and upper substrates 31 and 30 to bond the lower and upper substrates 31 and 30 to each other.

In the above described structure, an integrated circuit (IC) connects the gate driving block 32 to the data driving block 35, wherein the IC is provided by flexible printed circuit (FPC) or chip on film (COF) device. FIG. 3 illustrates an example using a gate COF device for the IC.

Further, a timing controller supplies control signals and video information to the gate driving block 32 and the data driving block 35.

The above liquid crystal panel 40 includes a pixel unit 40 for displaying images. The pixel unit 40 includes: a plurality of gate perpendicularly crossing a plurality of data lines on the lower substrate 11 to thereby define a matrix of pixel regions; a plurality of pixel electrodes respectively formed in each pixel regions defined by the gate and data lines; and a plurality of thin film transistors formed adjacent to crossings of the gate and data lines to thereby apply a signal on the data line to each pixel electrode in accordance with a signal on the gate line.

Each thin film transistor includes a gate electrode protruding from one side of the gate line; a gate insulating layer formed on an entire surface of the lower substrate including the gate electrode; an active layer overlapping the gate electrode; a source electrode overlapping one side of the data line and one side of the gate electrode; and a drain electrode provided at a predetermined distance from the source electrode.

A passivation layer is formed on the lower substrate including the data line, and a first contact hole is provided in the passivation layer at a predetermined portion corresponding to the drain electrode. The drain electrode contacts the pixel electrode through the first contact hole in the passivation layer.

The upper substrate 30 includes a color filter layer in each pixel region, a black matrix layer, and a common electrode corresponding to the pixel electrode of the lower substrate 31.

In the LCD device having the above described structure, liquid crystal molecules of the liquid crystal layer are driven by a voltage applied to the common and pixel electrodes that generates an electric field between the lower and upper substrate 31 and 30.

The illustrated LCD device is only one example configuration of the lower and upper substrates 31 and 30. The invention is not limited to this configuration and may be practiced using lower and upper substrates having differently configured lower and upper substrates.

The data driving block 45 includes a data pad unit 39 that transmits a data signal from the data chip 38 to the data line of the liquid crystal panel 40.

In the data pad unit 39 provided in each data TCP 33, pitch of data pads 42 vary in different portions of the data TCP 33.

In particular, the central portion of the data pad unit 39 has a plurality of data pads 42 arranged at a fixed pitch. In portions of the data pad unit 39 outside of the central portion, the data pad pitch increases gradually with increasing distance from the central portion of the data pad unit 39.

That is, if a central portion of the data pad unit 39 is defined as 'α', and if the side portions of the data TCP 33 are defined as 'β', then the pitch in portion 'α' is smaller than the pitch in portion 'β'. Accordingly, the interval 43a between the data pads 42 in the central portion of the data TCP 33 is smaller than the interval 43b between the data pads 42 in the side portion of the data TCP 33. In FIG. 4, 'd1' corresponds to the pitch in portion 'α', and 'd2' corresponds to the pitch in portion 'β'.

In each data TCP 33, the pitch of data pad 42 is relatively large in the side portion of the data TCP 33, which may be grossly aligned, and the pitch of data pad 42 is relatively small in the central portion of the data TCP 33, which may be finely aligned, so that it is possible to compensate for the misalignment that may be generated in the fine-pitch portion. Accordingly, the diverse pitch design allows the entire size of the data driving block to be reduced thereby decreasing the fabrication cost.

As shown in FIG. 5, each data pad unit 39 is defined to have a central portion and a side portion. The pitch of data pad unit 39 is different in the central portion and the side portion, with the pitch in the side portion being larger than the pitch of the central portion. The relative sizes of the central and side portions of the data pad unit can be varied arbitrarily.

As shown in FIG. 5, data pad units according to embodiments of the invention may employ different pitch profiles. For example in one embodiment of the invention, the data pad 39 may have a stepped pitch profile as illustrated in curve 'c1' of FIG. 5. In a data pad having a stepped profile, pitch in the central portion of the data pad unit 39 has a first constant value in the entire central portion, while the pitch in the side portion of the data pad unit 39 has a second constant value in the entire side portion larger than the first constant value in the central portion.

Alternatively the pitch profile of the data pad unit 39 may increase continuously with increasing distance from the center of the center portion of the data pad unit 39 as shown in curve 'c2' of FIG. 5. In a data pad unit having a pitch profile corresponding to the profile curve 'c2', the pitch at an arbitrary point in the center portion of the data pad unit 39 is smaller than the pitch at an arbitrary point in the side portion.

The invention may be practiced with pitch profiles other than those illustrated in FIG. 5.

As mentioned above, the LCD device according to the present invention has the following advantages.

In the LCD device according to the present invention, the pitch of data pad is larger in the side portion of the data pad unit than in central portion of the data pad unit 39, so that it is possible to compensate for the misalignment caused in the fine pitch.

As the pitch of data pad differs in respective portions of the data pad unit, the entire size of the data driving block can be decreased, thereby decreasing the fabrication cost.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device comprising:
    a liquid crystal panel including first and second substrates, and a liquid crystal layer disposed between the first and second substrates;
    a gate driving block including a plurality of gate drivers disposed in an edge area of the first substrate;
    a data driving block including a plurality of data drivers each connected to the first substrate and to a source printed circuit board (PCB) by a respective tape carrier package (TCP) of a plurality of data TCPs; and
    a data pad unit disposed on each data TCP,
    wherein pitches of data pads disposed on each data pad unit are designed to be increased gradually as going from a central portion to a side portion in each data TCP to thereby transmit a data signal from the data driving block to a data line of the liquid crystal panel and wherein a distance between the data pads in a central portion of each data TCP is smaller than a distance between the data pads in a side portion of respective the data TCP.

2. The LCD device of claim 1, wherein an IC to connect the gate driving block to the data driving block is one of a flexible printed circuit (FPC) and chip on film (COF) device.

3. The LCD device of claim 1, wherein the data pads have a predetermined width.

4. The LCD device of claim 1, further comprising a seal line disposed in the margin of the first and second substrates to bond the first and second substrates to each other.

5. A liquid crystal display (LCD) device comprising:
    a liquid crystal panel including first and second substrates, and a liquid crystal layer provided between the first and second substrates;
    a gate driving block including a plurality of gate drivers disposed in an edge area of the first substrate;
    a data driving block including a plurality of data drivers each connected to the first substrate and to a source printed circuit board (PCB) by a respective data tape carrier package (TCP) of a plurality of data TCPs; and
    a data pad unit disposed on each data TCP having data pads disposed on the data pad unit, the data pads to transmit a data signal from the data driving block to a data line of the liquid crystal panel,
    wherein the pitch of adjacent data pads of each data TCP increases with increased distance of the adjacent data pads from a central portion to a side portion of the respective data TCP according to a continuous pitch profile curve, and
    wherein a distance between the data pads in a central portion of each data TCP is smaller than a distance between the data pads in a side portion of the respective data TCP.

6. The LCD device of claim 5, wherein an IC to connect the gate driving block to the data driving block is one of a flexible printed circuit (FPC) and chip on film (COF) device.

7. The LCD device of claim 5, wherein the data pads have a predetermined width.

8. A method of manufacturing a liquid crystal panel comprising:
    providing a first and a second substrate;
    disposing a liquid crystal layer between the first and second substrates; and
    bonding the first substrate to the second substrate;
    disposing a gate driving block including a plurality of gate drivers in an edge area of the first substrate;
    providing a data driving block including a plurality of data drivers each connected to the first substrate and to a source printed circuit board (PCB) by a respective data tape carrier package (TCP) of a plurality data TCPs;
    disposing a data pad unit on each data TCP having data pads disposed on each data pad unit, the data pads to transmit a data signal from the data driving block to a data line of the liquid crystal panel, wherein pitches of data pads disposed on each data pad unit are designed to be increased gradually as going from a central portion to a side portion in the respective data TCP and wherein a distance between the data pads in the central portion of each data TCP is smaller than a distance between the data pads in a side portion of the respective data TCP.

9. The method of claim 8, wherein an IC to connect the gate driving block to the data driving block is one of a flexible printed circuit (FPC) and chip on film (COF) device.

10. The method of claim 8, wherein the data pads have a predetermined width.

11. The method of claim 8, wherein bonding the first substrate to the second substrate includes disposing a seal line in the margin of one of the first substrate and the second substrate.

* * * * *